(12) United States Patent
Xu

(10) Patent No.: US 10,478,906 B2
(45) Date of Patent: Nov. 19, 2019

(54) DUPLEX SAW

(71) Applicant: ZHENGYANG INDUSTRY & INVESTMENT CO., LTD., Zhejiang (CN)

(72) Inventor: Kesong Xu, Zhejiang (CN)

(73) Assignee: ZHENGYANG INDUSTRY & INVESTMENT CO., LTD., Zhejiang (CN)

( * ) Notice: Subject to any disclaimer, the term of this patent is extended or adjusted under 35 U.S.C. 154(b) by 0 days.

(21) Appl. No.: 15/766,547

(22) PCT Filed: Jan. 12, 2017

(86) PCT No.: PCT/CN2017/070960
§ 371 (c)(1),
(2) Date: Apr. 6, 2018

(87) PCT Pub. No.: WO2018/053976
PCT Pub. Date: Mar. 29, 2018

(65) Prior Publication Data
US 2018/0297132 A1    Oct. 18, 2018

(30) Foreign Application Priority Data

Sep. 20, 2016  (CN) .......................... 2016 1 0834160
Sep. 20, 2016  (CN) ...................... 2016 2 1065164 U

(51) Int. Cl.
*B23D 45/06* (2006.01)
*B23D 47/12* (2006.01)
(Continued)

(52) U.S. Cl.
CPC ........... *B23D 45/065* (2013.01); *B23D 45/04* (2013.01); *B23D 47/12* (2013.01); *B23D 59/006* (2013.01); *B27B 9/02* (2013.01); *B27G 19/04* (2013.01)

(58) Field of Classification Search
CPC .... B23D 45/06; B23D 45/065; B23D 45/067; B23D 45/068; B23D 45/04; B23D 45/042;
(Continued)

(56) References Cited

U.S. PATENT DOCUMENTS

| 5,988,031 A * | 11/1999 | Wixey | B23D 45/048 83/471.3 |
| 2008/0022825 A1* | 1/2008 | Spinelli | B23D 45/048 83/471.3 |
| 2010/0269660 A1* | 10/2010 | Janson | B23Q 11/06 83/471.3 |

FOREIGN PATENT DOCUMENTS

| CN | 101422832 A | 5/2009 |
| CN | 101804483 A | 8/2010 |

(Continued)

*Primary Examiner* — Jennifer B Swinney
(74) *Attorney, Agent, or Firm* — Muncy, Geissler, Olds & Lowe, P.C.

(57) ABSTRACT

A duplex saw, including a machine head assembly of which a top portion is mounted with a cutting working platform, a base, a rotating disk, and a machine head rotating seat positioned between the machine head assembly and the rotating disk and hinged with the machine head assembly and the rotating disk. The machine head assembly includes a motor, a machine frame, a gear box body, a transmission mechanism and a saw blade. The motor is fixed on the machine frame. The transmission mechanism is provided in the gear box body and constitutes a gear box assembly. A gear shaft of the motor drives the transmission mechanism. The gear box assembly can be rotated about the gear shaft of the motor. The blade is fixed on an output shaft of the transmission mechanism, the output shaft and the gear shaft of the motor are parallel to each other.

7 Claims, 4 Drawing Sheets

(51) Int. Cl.
 *B23D 45/04* (2006.01)
 *B27G 19/04* (2006.01)
 *B27B 9/02* (2006.01)
 *B23D 59/00* (2006.01)

(58) Field of Classification Search
 CPC .... B23D 45/044; B23D 45/048; B23D 47/02; B23D 47/025; B23D 47/12; B27B 5/222; B27B 5/26; B27B 5/24; B27B 5/243; B27B 5/265; B27B 5/165; Y10T 83/7684; Y10T 83/7693; Y10T 83/7697; Y10T 83/7701; Y10T 83/7705
 See application file for complete search history.

(56) References Cited

FOREIGN PATENT DOCUMENTS

| | | | | |
|---|---|---|---|---|
| CN | 204504365 U | 7/2015 | | |
| CN | 105081453 A | 11/2015 | | |
| CN | 106270756 A | 1/2017 | | |
| DE | 202009002774 U1 * | 7/2010 | | |
| EP | 1614492 A1 | 1/2006 | | |
| EP | 2436494 A2 * | 4/2012 | ........... | B23D 45/044 |
| EP | 2602075 A1 * | 6/2013 | | |
| FR | 2123954 A5 * | 9/1972 | ........... | B23D 45/044 |
| WO | WO2015094853 A1 | 6/2015 | | |

* cited by examiner

DUPLEX SAW

FIELD OF THE INVENTION

The present invention relates to an electric cutting tool, and more particularly to a duplex saw capable of switching between a table saw working mode and a miter saw working mode.

BACKGROUND OF THE INVENTION

A duplex saw is a commonly used power tool and widely used in the field of machinery manufacturing and other fields. The duplex saw can be functionally converted between the two working states of a miter saw and a table saw, and is very convenient to use. There are two commonly used solutions in the prior art: one is a commonly used duplex saw structure, generally, the height of a motor and a saw blade are fixed, the function of sawing is achieved by adjusting the height of a cutting working platform; the other is that a panel of the cutting working platform is fixed, the lift of the saw blade is achieved by lifting or rotating a motor assembly to realize the function of cutting.

The above two solutions are flawed in use. For the first solution, during the process of adjusting the height of the cutting working platform, the relative position between a panel of the cutting working platform and the saw blade can be changed, in order to ensure a smooth height adjustment, a guiding mechanism generally has a relative large gap and maintains poorly the stability of a relative position, thus greatly reducing the precision of the cutting. since the relative position between the motor and the saw blade is fixed, the thickness of the motor in the vertical direction determines the cutting ability of the cutting and the inclined cutting in height; in fact, most manufacturers make a very flat motor assembly, which can slightly increase the cutting height of the cutting and the inclined cutting, however, this is very detrimental to the design of the motor and a motor shell.

For the second solution, there are two ways to lift the motor assembly via a lift mechanism, one is that the motor is lifted vertically or rotated up and down along one fulcrum outside the motor assembly, the principle of this lifting method is similar to that of the first one, the movement of the motor is just used for replacing the movement of a platen; because of a motor lift guiding machining accuracy assurance, the relative accuracy during the lift can be improved to a certain extent, however, the thickness of the motor assembly still affects the cutting capacity; in addition, the motor's lifting mechanism greatly increases the complexity of the mechanism. The other is that the whole motor assembly is rotated about the center of the motor, the eccentricity formed by the center distance of the rotation of the gear is used for switching the inclined cutting and the cutting, for example, china patent No. CN205020940 discloses a duplex saw, because the motor needs to be rotated, the entire rotated trajectory of the motor shape is round, therefore, a height of a whole machine is increased relative to the conventional flat motor assembly, the increase of a package volume affects not only a transport cost but also a storage space. furthermore, an output shaft of this structure and a gear only can be positioned within an outer circle of the motor, an eccentricity distance is limited, the eccentricity distance determines the maximum height of the saw blade from the platen to the upper portion of the platen and can not provide a enough lift space, thus limiting the cutting capacity. to improve the cutting capacity, an outer circle of the motor can only be increased, this causes an excessive machine size and needs to increase the mechanical properties of a machine frame structure that supports the motor assembly, furthermore, inlet and outlet lines of a power are wound, worn and other risks during the rotation of the motor.

Regardless of which solution used, the saw blade in a non-work area in the technical solution in the prior art is exposed, it is difficult to control complete protection, when the cutting is carried out in the non-work area, the non-work area is below the platen while the non-work area is above the platen during the inclined cutting, based on safety requirements, the saw blade in the non-work area needs be completely protected. therefore, it is common practice to add an additional shield in the non-work area as an attachment for protection, special measures need be taken to prevent the attachment from being discarded, so the structure is complicated and inconvenient to operate.

For the above problems, many manufacturers and people of insight have carried out development and research, but so far no more ideal product is available.

SUMMARY

To overcome the above drawbacks of a duplex saw in the prior art, the present invention aims at providing a duplex saw with a simple and reasonable structure, flexible and easy operation of functional conversion, safe and reliable use, big cutting capacity, high cutting accuracy, and good dust removing effect.

The present invention solves the above technical problems and provides a technical solution, a duplex saw comprises a machine head assembly of which a top portion is mounted with a table cutting working platform, a base, a rotating disk, and a machine head rotating seat positioned between the machine head assembly and the rotating disk and hinged with the machine head assembly and the rotating disk respectively, the machine head assembly comprises a motor, a machine frame, a gear box body, a transmission mechanism and a saw blade, the motor is fixed on the machine frame, the transmission mechanism is provided in the gear box body and constitutes a gear box assembly, a gear shaft of the motor drives the transmission mechanism to be rotated, the gear box assembly can be rotated about the gear shaft of the motor, the saw blade is fixed on an output shaft of the transmission mechanism, the output shaft and the gear shaft of the motor are parallel to each other.

For the further solution of the present invention, the gear box body is provided thereon with a rotating sleeve, the machine frame is provided thereon with a rotating seat rotatably cooperated with the rotating sleeve.

For the further solution of the present invention, the gear box body is provided thereon with a conversion shield, the conversion shield is positioned above the saw blade during the inclined cutting, the conversion shield is positioned below the saw blade during the cutting.

For the further solution of the present invention, a center sleeve of the rotating seat is provided thereon with a gear box pinch plate and a machine frame pinch plate which are mutually rotatable, the machine frame pinch plate is fixed on the machine frame and blocks the gear box pinch plate, the gear box pinch plate is fixed on the gear box body and blocks the machine frame pinch plate.

For the further solution of the present invention, the machine frame is provided thereon with a locking mechanism for locking the gear box assembly, the locking mechanism comprises a locking wrench and a locking platen, the locking wrench passes through the machine frame and is mutually connected with the locking platen, the locking platen clamps tightly the gear box body via the machine frame.

For the further solution of the present invention, the two sides of the saw blade are correspondingly provided with left and right shields fixed with the machine frame and provided with a dust collecting channel at a rear portion thereof, the left and the right shields are provided with a dust guiding hinged plate therebetween, the conversion shield constitutes a dust removing structure with the dust collecting channel via the dust guiding hinged plate during the cutting.

For the further solution of the present invention, the transmission mechanism comprises an output gear and a middle gear which are mutually meshed with each other, the output gear is provided on the output shaft, the middle gear is provided on a middle shaft, the gear shaft of the motor is meshed with the middle gear.

For the further solution of the present invention, the gear box assembly is provided thereon with a conversion handle.

With the above structure, compared with the prior art, the present invention has the following advantages and effects: first, as the gear box can be rotated around the motor gear shaft, if the gear box is rotated, the function switching between a miter working mode and a cutting working mode can be realized, a working mode is a miter working mode when the output shaft is below the gear shaft of the motor, the working mode is the miter working mode when the output shaft is above the gear shaft of the motor, under the same transmission ratio, a center distance between the output shaft and the gear shaft of the motor can be changed via the middle gear, thus being capable of effectively improving the cutting capacity of the inclined cutting and the cutting. Second, the gear box can be tightly attached to the machine frame via the locking pinch plate of the locking mechanism and forms a fixed connection, thus ensuring the stability and reliability of the saw blade during the work and the cutting accuracy. Third, the conversion shield on the gear box body can completely cover the saw blade exposed on the cutting working platform during the inclined cutting and the saw blade exposed under the cutting working platform during the cutting, thus ensuring the safety and reliability. Fourth, the conversion shield constitutes the dust removing structure with the dust collecting channel via the dust guiding hinged plate during the cutting, the dust removing structure utilizes cutting airflow of the saw blade to discharge sawdust from a dust collecting port of the dust collecting channel to a dust collecting bag, thus solving the problem of dust flying and difficult collection of the duplex saw in the prior art during the cutting.

1: Cutting Shield; 2: Cutting Working Platform, 3: Motor, 4: Machine Frame; 5: Inclined Cutting Shield; 6: Saw Blade; 7: Rotating Disk; 8: Base; 9: Locking Wrench, 10: Machine Head Rotating Seat, 11 Connection Rod Assembly; 12 Dust Collecting Channel; 13 Left Shield; 14: Gear Shaft of Motor; 15: Output Shaft; 16 Gear Box Pinch Plate; 17: Machine Frame Pinch Plate; 18: Conversion Handle; 19: Rotation Sleeve; 20: Gear Box Body; 21: Conversion Shield; 22: Locking Platen; 23: Output Gear; 24: Middle Gear; 25: Gear Box Cover; 26: Saw Blade Clamp Plate; 27: Right Shield; 28 Dust Guiding Hinged Plate; 29: Rotating Seat.

DETAILED DESCRIPTION

Figure 1:
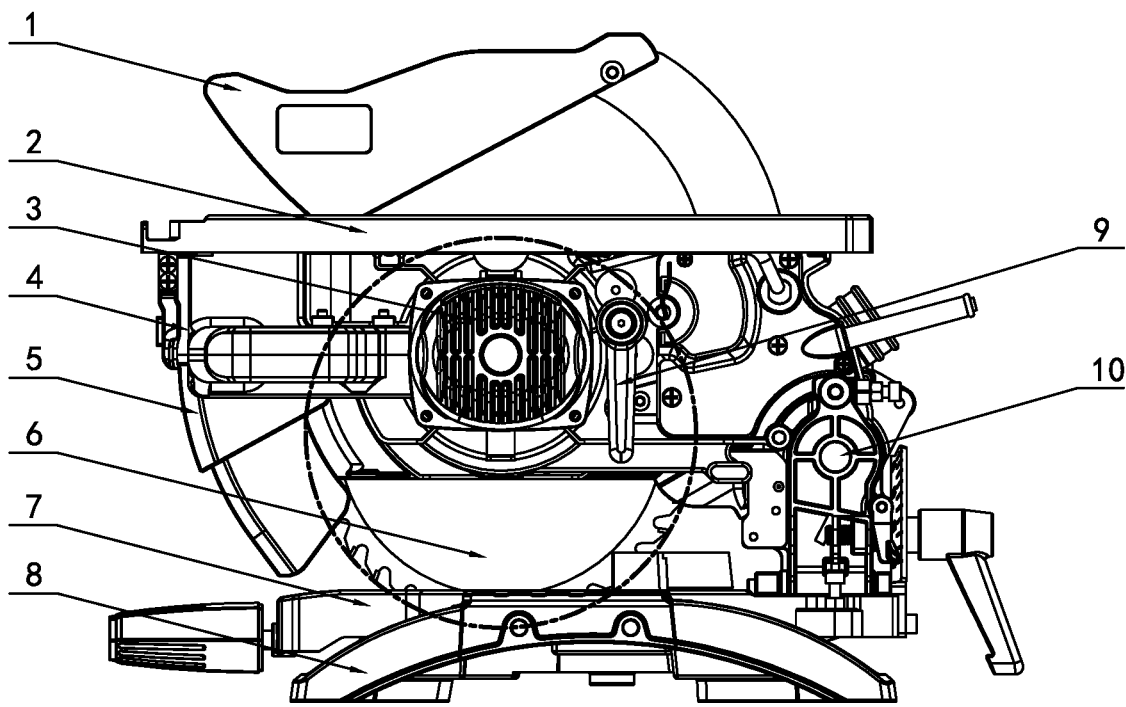
FIG. 1 is a diagram of a main view structure during an inclined cutting of the present invention.
Figure 2:
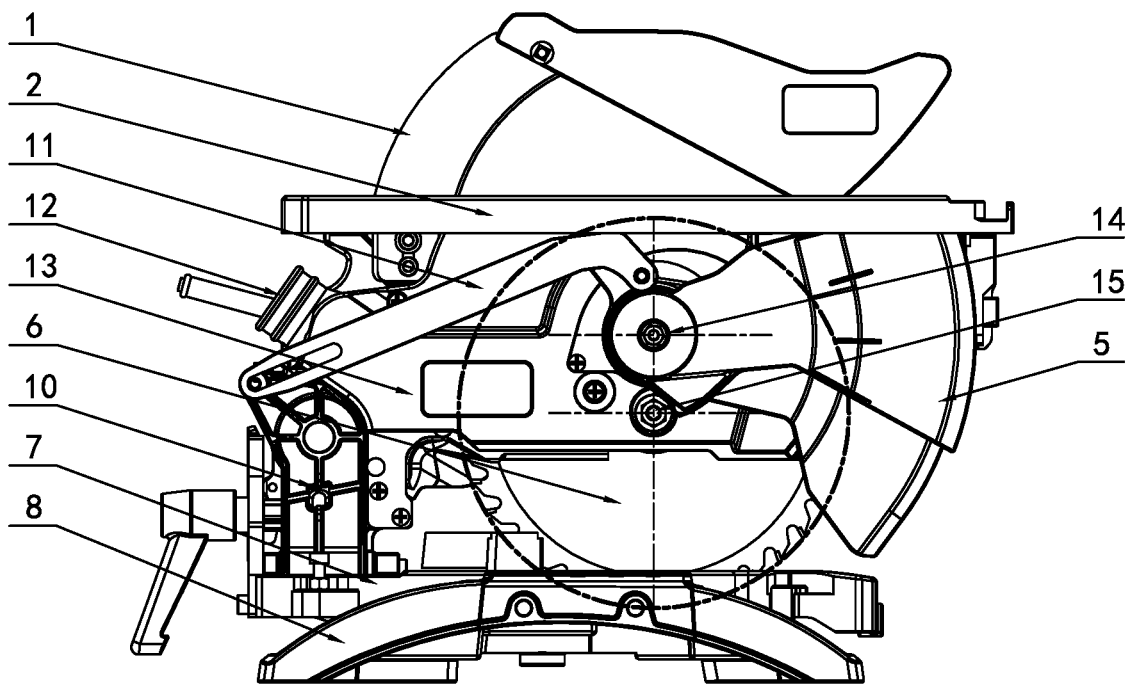
FIG. 2 is a diagram of a back view structure during an inclined cutting of the present invention.
Figure 3:
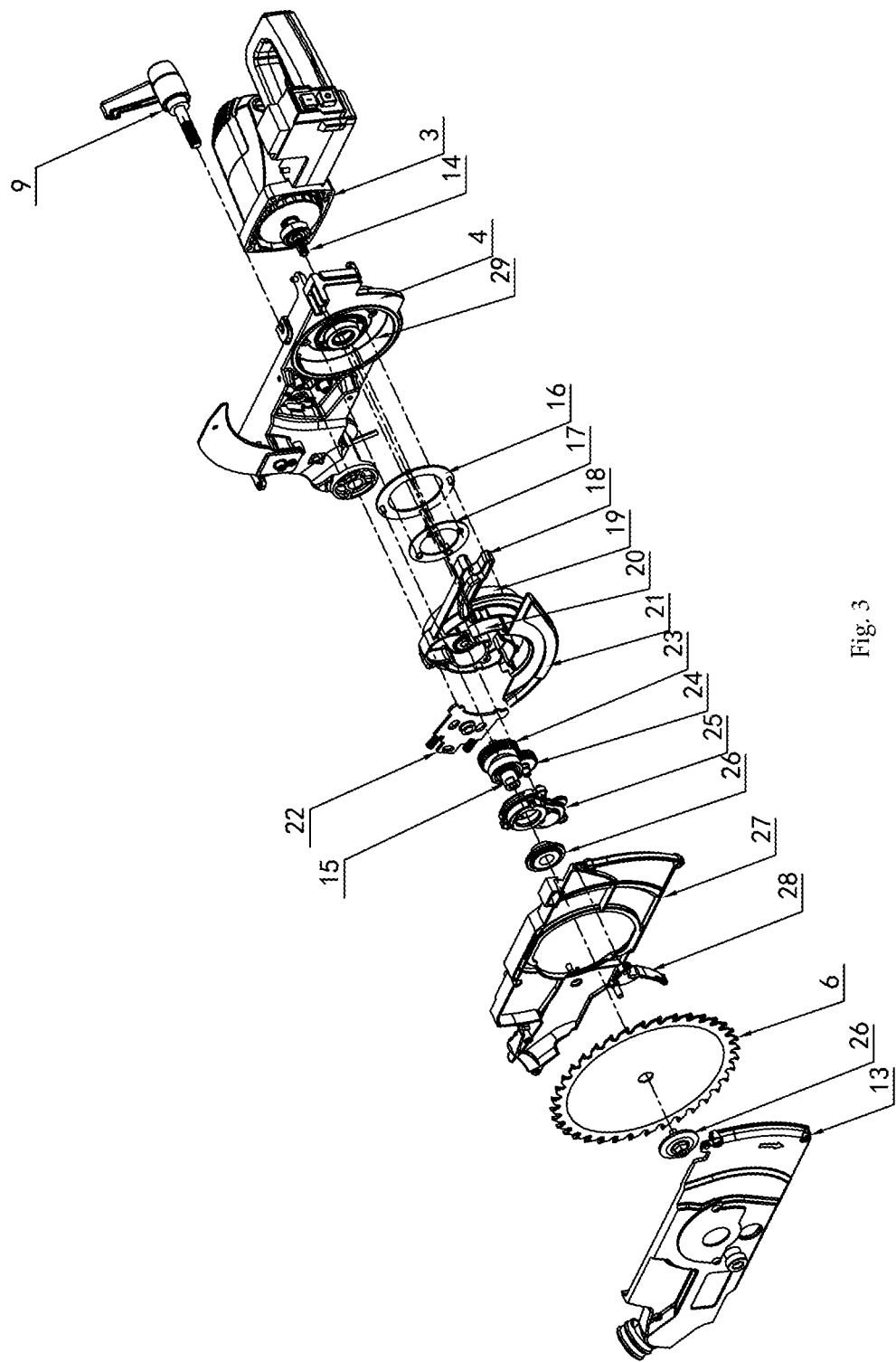
FIG. 3 is a diagram of an exploded structure of a machine head assemble of the present invention.
Figure 4:
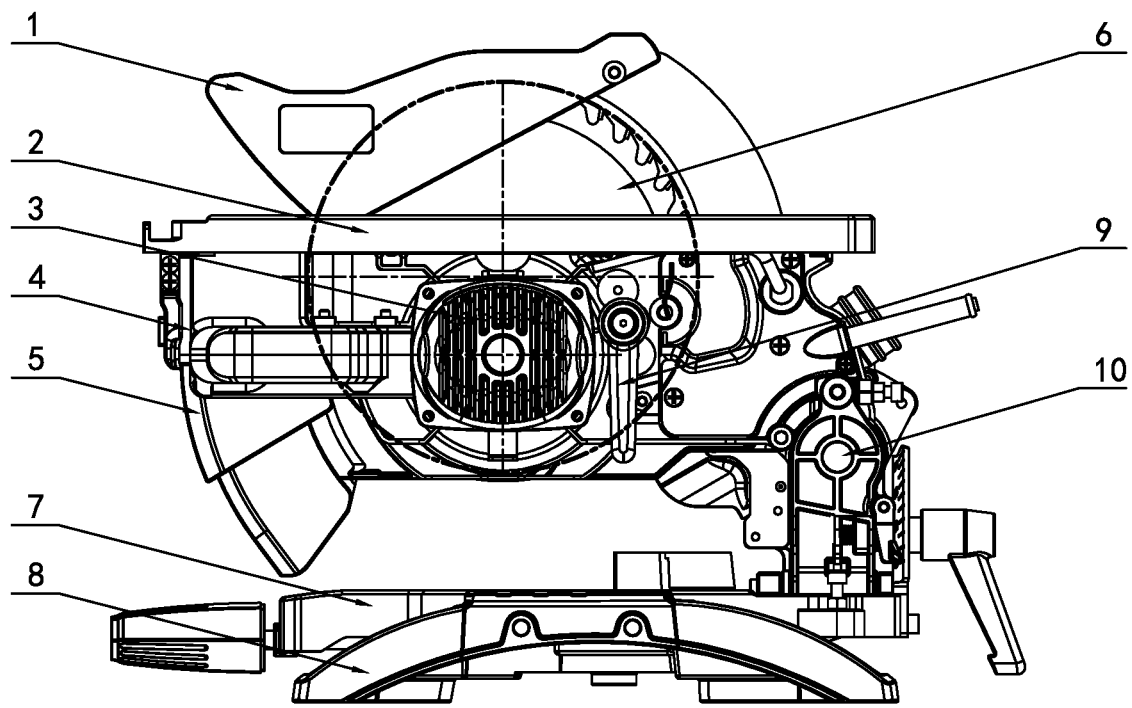
FIG. 4 is a diagram of a main view structure during the cutting of the present invention.
Figure 5:
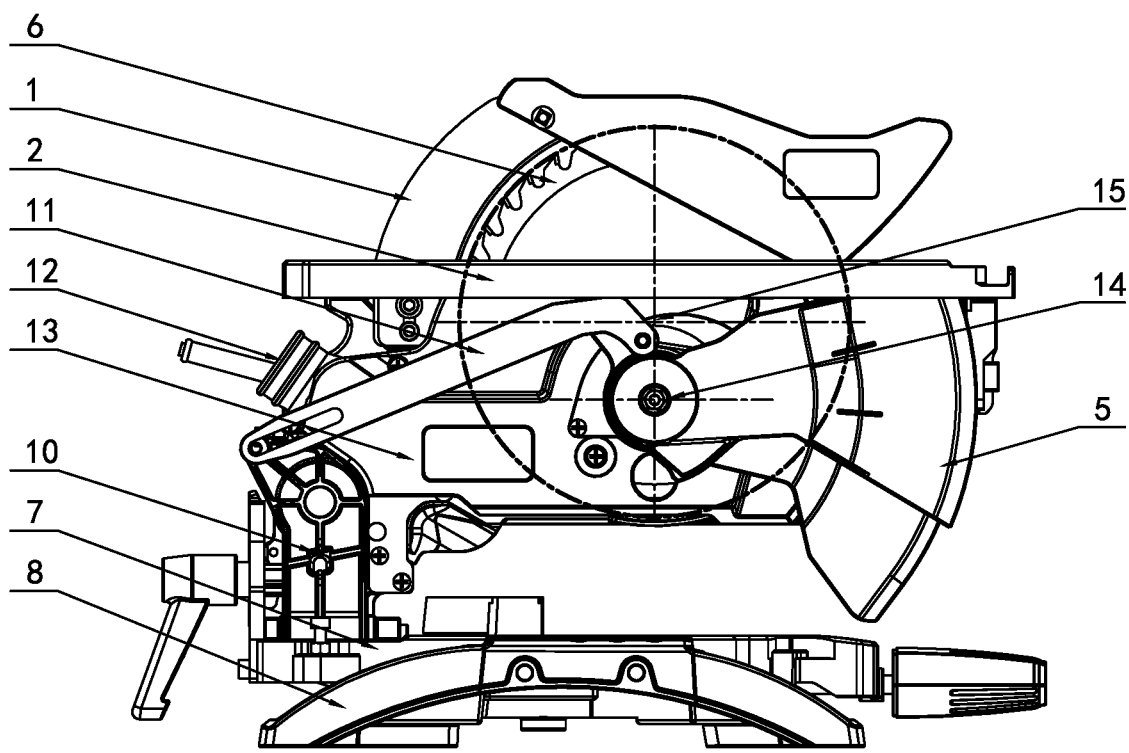
FIG. 5 is a diagram of a back view structure during the cutting of the present invention.
Figure 6:
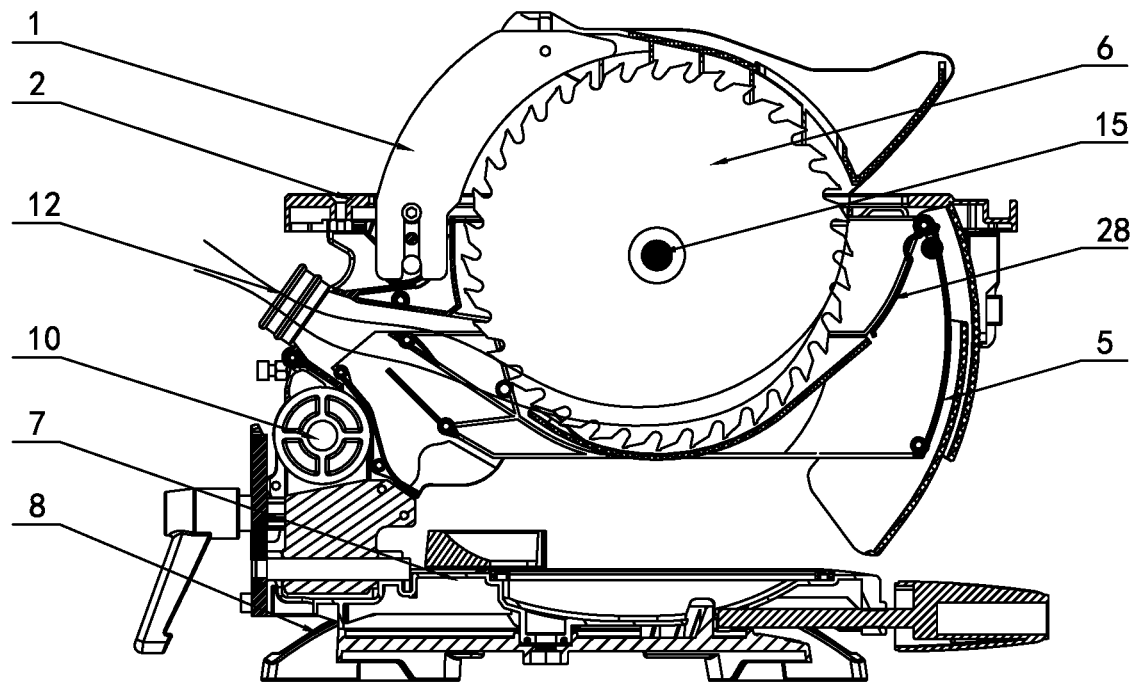
FIG. 6 is a diagram of a dust removing structure during the cutting of the present invention.
Figure 7:
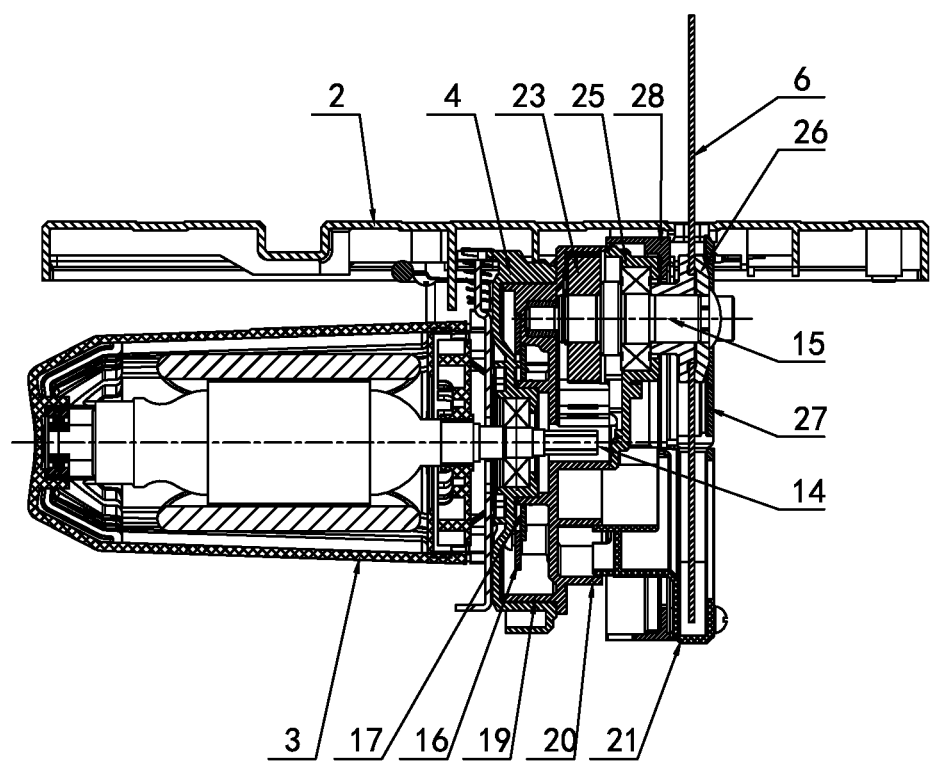
FIG. 7 is a structural diagram of a machine head assembly during the cutting of the present invention.

FIGS. 1-7 show embodiments of a duplex saw of the present invention, the duplex saw comprises a machine head assembly of which a top portion is mounted with a table cutting working platform 2, a base 8, a rotating disk 7, a machine head rotating seat 10 positioned between the machine head assembly and the rotating disk 7 and hinged with the machine head assembly and the rotating disk 7 respectively, and a connection rod assembly 11, wherein the machine head assembly comprises a motor 3, a machine frame 4, a gear box body 20, a transmission mechanism and a saw blade 6, the motor 3 is fixed on the machine frame 4, a gear box cover is fixed on the gear box body 20, the transmission mechanism is provided in the gear box body 20 and constitutes a gear box assembly, a gear shaft 14 of the motor drives the transmission mechanism to be rotated, the gear box assembly can be rotated about the gear shaft 14 of the motor, the saw blade 6 is fixed on an output shaft 15 of the transmission mechanism, the output shaft 15 and the gear shaft 14 of the motor are parallel to each other and in the same vertical surface. To ensure a simple functional conversion structure and flexible and easy operation, a rotating sleeve 19 is provided on the gear box body 20, a rotating seat 29 rotatably cooperated with the rotating sleeve 19 is provided on the machine frame 4. A center sleeve of the rotating seat 29 is provided thereon with a gear box pinch plate 16 and a machine frame pinch plate 17 which are mutually rotatable, the machine pinch plate 17 is fixed on the machine frame 4 and blocks the gear box pinch plate 16, the gear box pinch plate 16 is fixed on the gear box body 20 and blocks the machine frame pinch plate 17. To facilitate the operation of functional conversion, the gear box assembly is provided thereon with a conversion handle 18.

To ensure safety and reliability of the use, the gear box body 20 is provided thereon with a conversion shield 21, the conversion shield is positioned above the saw blade during an incline cutting while being positioned below the saw blade 6 during the cutting.

To ensure the stability and reliability of the work of the saw blade 6, the machine frame 4 is provided thereon with a locking mechanism for locking the gear box assembly, the locking mechanism comprises a locking wrench 9 and a locking platen 22, the locking wrench 9 passes through the machine frame 4 and is mutually connected with the locking platen 22, the locking platen 22 clamps tightly the gear box body 20 via the machine frame 4. if the locking wrench 9 is released, function conversion can be carried out.

To ensure the safety and reliability of the use, the two sides of the saw blade 6 are correspondingly provided with left and right shields 13, 27 fixed with the machine frame 4, and provided with a dust collecting channel 12 at a rear portion thereof, the left and the right shields 13, 27 are provided with a dust guiding hinged plate 28 therebetween, the conversion shield 21 constitutes a dust removing structure with the dust collecting channel 12 via the dust guiding hinged plate 21, sawdust, driven by a cutting airflow of the saw blade 6, is automatically discharged from a dust collecting port of the dust collection channel 12 to a dust collecting bag to achieve automatic sawdust removal.

To realize the reasonable cutting capacity, the transmission mechanism comprises an output gear 23 and a middle gear 24, the output gear 23 is provided on the output shaft 15, the middle gear 24 is provided on a middle shaft, the gear shaft 14 of the motor is meshed with the middle gear 24. of course, the transmission mechanism can also use other transmission mechanism, for example, a belt drive, a two-level drive, a hybrid drive and the like.

The foregoing descriptions are merely specific embodiments of the present invention and are not intended to provide any form of limitation to the present invention. Any simple amendment, equivalent change or modification made without departing from the technical solutions of the present invention all falls within the protection scope of the present invention.

The invention claimed is:

1. A duplex saw, comprising a machine head assembly of which a top portion is mounted with a cutting working platform, a base, a rotating disk, and a machine head rotating seat positioned between the machine head assembly and the rotating disk and hinged with the machine head assembly and the rotating disk respectively, wherein the machine head assembly comprises a motor, a machine frame, a gear box body, a transmission mechanism and a saw blade, the motor is fixed on the machine frame, the transmission mechanism is provided in the gear box body and constitutes a gear box assembly, a gear shaft of the motor drives the transmission mechanism to be rotated, the saw blade is fixed on an output shaft of the transmission mechanism, the output shaft and the gear shaft of the motor are parallel to each other;

wherein the gear box body is provided thereon with a rotating sleeve connected to a handle, the machine frame is provided thereon with a rotating seat, so that upon operation of the handle the rotating sleeve rotates relative to the rotating seat.

2. The duplex saw according to claim 1, wherein the gear box body is provided thereon with a conversion shield, the conversion shield is positioned above the saw blade during inclined cutting, the conversion shield is positioned under the saw blade during cutting.

3. The duplex saw according to claim 1, wherein a center shaft sleeve of the rotating seat is provided with a gear box pinch plate and a machine frame pinch plate which are mutually rotatable, the machine frame pinch plate is fixed on the machine frame and blocks the gear box pinch plate, the gear box pinch plate is fixed on the gear box body and blocks the machine frame pinch plate.

4. A duplex saw, comprising a machine head assembly of which a top portion is mounted with a cutting working platform, a base, a rotating disk, and a machine head rotating seat positioned between the machine head assembly and the rotating disk and hinged with the machine head assembly and the rotating disk respectively, wherein the machine head assembly comprises a motor, a machine frame, a gear box body, a transmission mechanism and a saw blade, the motor is fixed on the machine frame, the transmission mechanism is provided in the gear box body and constitutes a gear box assembly, a gear shaft of the motor drives the transmission mechanism to be rotated, the saw blade is fixed on an output shaft of the transmission mechanism, the output shaft and the gear shaft of the motor are parallel to each other;

wherein the machine frame is provided thereon with a locking mechanism for locking the gear box assembly, the locking mechanism comprises a locking wrench and a locking platen, the locking wrench passes through the machine frame and is mutually connected with the locking platen, the locking platen clamps tightly the gear box body via the machine frame.

5. The duplex saw according to claim 4, wherein the saw blade has a first side and a second side, each side is coupled to a shield which are fixed with the machine frame and provided with a dust collecting channel at a rear portion thereof, the shields are provided with a dust guiding hinged plate therebetween, a conversion shield constitutes a dust removing structure with the dust collecting channel via the dust guiding hinged plate during cutting.

6. The duplex saw according to claim 5, wherein the transmission mechanism comprises an output gear and a middle gear which are mutually meshed with each other, the output gear is provided on the output shaft, the middle gear is provided on a middle shaft, the gear shaft of the motor is meshed with the middle gear.

7. The duplex saw according to claim 5, wherein the gear box assembly is provided thereon with a handle for selectively converting the duplex saw between cutting and inclined cutting.

* * * * *